March 14, 1961 N. N. AULT 2,974,388
PROCESS OF MAKING CERAMIC SHELLS
Filed Jan. 30, 1958 2 Sheets-Sheet 1
Fig. 1
Fig. 2
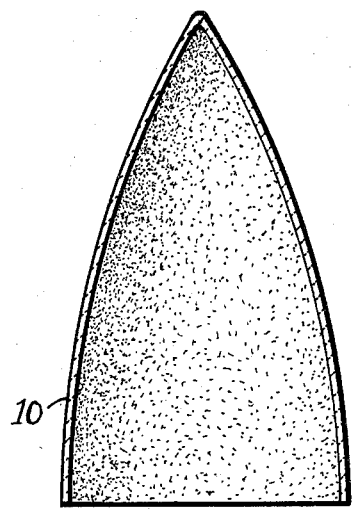
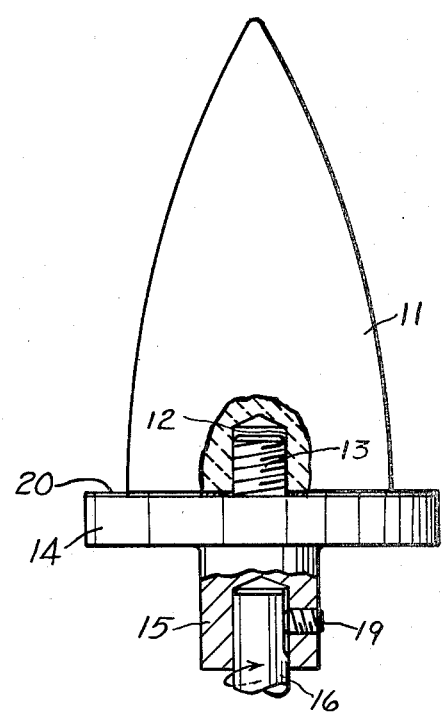
Fig. 3
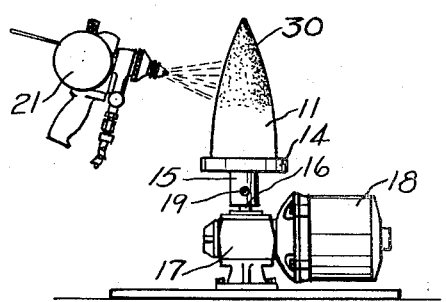
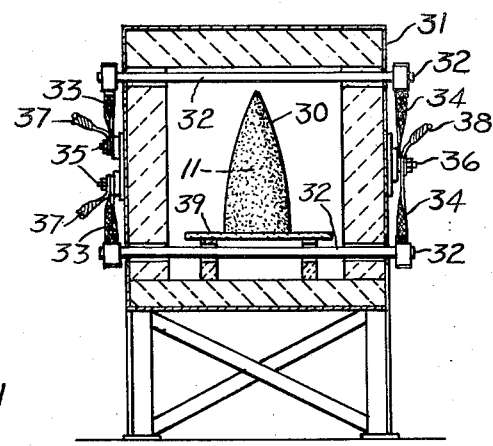
Fig. 5
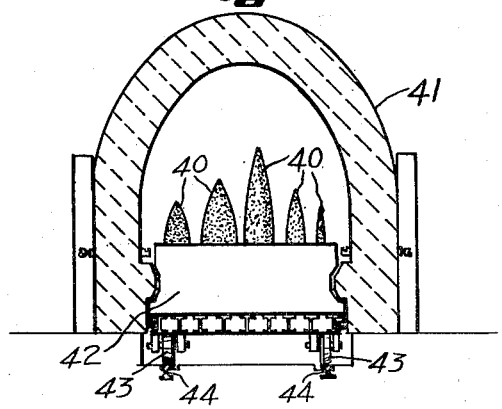
Fig. 4
INVENTOR
NEIL N. AULT
BY
ATTORNEY

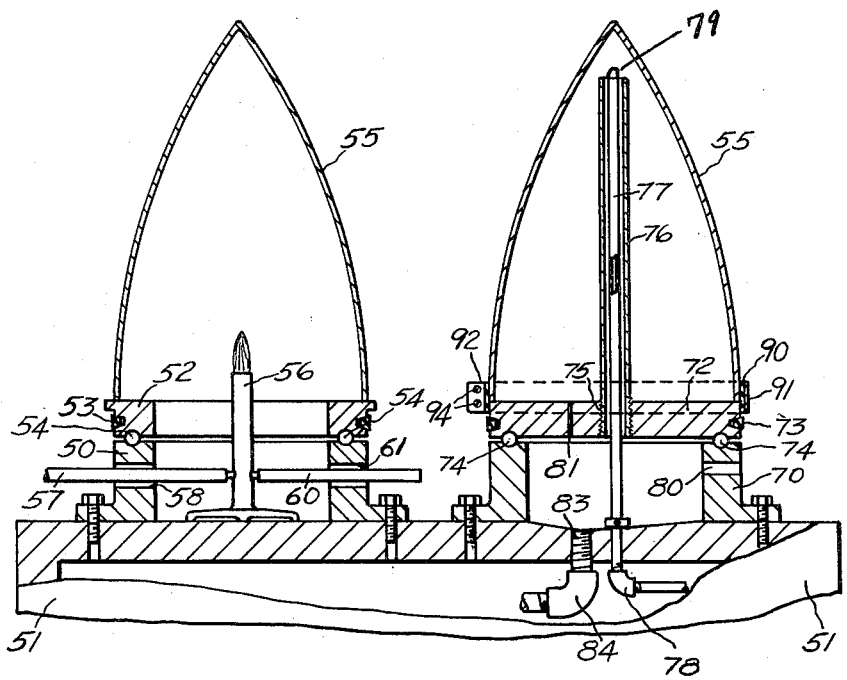
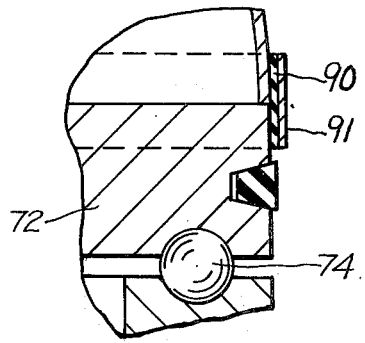

United States Patent Office 2,974,388
Patented Mar. 14, 1961

2,974,388

PROCESS OF MAKING CERAMIC SHELLS

Neil N. Ault, Holden, Mass., assignor to Norton Company, Worcester, Mass., a corporation of Massachusetts Filed Jan. 30, 1958, Ser. No. 712,144

8 Claims. (Cl. 25—156)

The invention relates to a process of making ceramic shells, other thin walled articles, and ceramic products of high density and high strength.

One object of the invention is to provide a process for making superior radomes for high speed aircraft, missiles and rockets. Another object is to make nose cones for missiles and rockets. Another object is to provide a process for making shells, by which I mean to include any thin walled object, even including flat pieces, out of ceramic material, avoiding excessive shrinkage. Another object of the invention is to provide a process for making thin walled bodies of revolution out of metal oxide.

Another object of the invention is to provide a process for making ceramic pieces with a minimum of distortion on firing. Another object of the invention is to provide a process for making extremely intricate shapes out of a ceramic material. Another object of the invention is to make ceramic shapes which are impervious. Another object is to provide an inexpensive process for the manufacture of radomes. Another object is to provide surprisingly strong dense impervious oxide products by a novel process designed to give low rejections. Another object is to provide a novel process for making pure oxide type useful products from highly refractory oxides.

Other objects will be in part obvious or in part pointed out hereinafter.

The process is particularly useful for the manufacture of ceramic radomes. Radomes may be defined as protective covers over radar antennas, often dome shaped. They have to be sufficiently transparent to the radar frequencies to pass the microwaves satisfactorily. In general this means high dielectric constant and low loss factor at microwave frequencies. In addition, missile radomes must be strong enough to withstand aerodynamic or other imposed stresses. Missile radomes are usually conical or ogive shaped. For high speed vehicles, they must be adequately refractory to withstand aerodynamic heating. They should be impervious.

As a class, certain ceramic materials meet these requirements. Alumina is particularly suitable. Other ceramic compositions can also be employed.

The accompanying drawings illustrate a radome for a rocket and one example of steps in the process of manufacture, Figure 1 is an axial sectional view of a radome which is a body of revolution, Figure 2 is a view partly in side elevation and partly in section of a rotary support and a form thereon for the manufacture of the radome, Figure 3 is a side elevation of the form and a rotary support for it mounted on the shaft of a reduction gearing connected to an electric motor and a flame spray gun shown fusing, atomizing and spraying ceramic material onto the form, Figure 4 is a sectional view of a kiln illustrating one way of eliminating the form, Figure 5 is a sectional view of another kiln illustrating one way of setting the product while heating it to sinter the ceramic material, Figure 6 is a view mostly in section showing a table with two rotary supports for carrying out steps of other examples of the process of the invention, Figure 7 is an enlarged sectional view of the right hand side of the right hand support of Figure 6 illustrating how the form is secured to the rotary support.

The radome 10 in Figure 1 is a radome for a rocket and illustratively may be 15" high, 10" diameter, and wall thickness ¼", and is a hollow projectile-shaped body of revolution. The one shown is aerodynamically shaped for low air drag at speeds above the velocity of sound. Likewise, Figure 1 could be considered to represent a nose cone or other thin-walled ceramic product.

Radomes should be composed of essentially non-metallic material because elementary metal absorbs the microwaves of radar, although under some circumstances it is possible that metal may be combined with non-metallic materials in certain spaced relationships. For application to rockets the radomes should be refractory because of the heat generated during flight. The radome material must have adequate strength to resist breakage from handling, assembly, and flight stresses, and the mounting design must be adequate to distribute the stresses over appreciable areas and avoid local overstressing. In general, the dielectric properties of the ceramic material should be uniform, and close dimensional control, especially for wall thickness, is important.

Many of the metal oxides are refractory and stable and some such as alumina are readily available at low prices. Some have low absorption of radar rays. Alumina is stronger than most other ceramics. My process makes strong thin-walled bodies out of metal oxides such as alumina and especially makes superior radomes according to specifications. Many radomes are bodies of revolution. While the wall thickness of the radome shown is uniform, I understand that certain specifications call for varying thickness of the wall and my process will make radomes according to such specifications. In general terms, thin-walled articles of wall thickness less than $\frac{1}{20}$, or at most $\frac{1}{10}$, of the maximum linear surface dimension are favorably made by my process.

Referring now to Figure 2, I provide a form 11 of ogive shape in the case of the manufacture of a radome which, except for allowance for shrinkage, has the shape of the inside of the radome to be formed. As one step in the process hereinafter described the form 11 is to be eliminated during the process of manufacture of a body 10, the form therefore can be made of carbon which can be burned out; it can have a surface of salt which can be dissolved; or it can be made of many other substances which can be eliminated in many different ways. It can be made of materials which can be eliminated by acids such as thin spun metal shells. Also when thin walled metal shells are used for forms they can be removed by electrolysis.

Another way to eliminate the form is by differential contraction such as is obtained when a heated aluminum metal form is coated. On cooling to room temperature aluminum contracts sufficiently more than the ceramic coating so that it separates away from it because the adhesion conditions between the aluminum surface and the coating are arranged to be insufficient to withstand the differential contraction, and separation occurs.

As there are many kinds of materials which can be used to make the forms and thereafter eliminated, I claim the step of elimination broadly.

As one example of the next manufacturing step, the form 11 has a screw threaded socket 12 by means of which it is attached to a screw threaded stud portion 13 extending upwardly from a rotary support 14 having a hub 15, mounted as shown in Figure 3, on a shaft 16 of reduction gearing 17 connected to a motor 18. A screw 19, Figure 2, secures the hub 15 to the shaft 16. It is desirable to provide a mask 20 made of rubber or almost any substance to keep the oxide from building up on the surface of the support 14.

Referring now to Figure 3, I provide a spray gun 21. This can be as disclosed in U.S. Letters Patent No. 2,707,691 granted on application of my colleague Wm. Maxwell Wheildon, Jr. This patent discloses full information about the process of coating materials wtih metal oxides. Other guns and heat-spray processes not limited to combustion flames can be used. Ceramic powder feed can be employed if a relatively strong coating is satisfactorily built up to thicknesses of the order of ¼" to ½".

Thus, while the form 11 is rotating, I coat it with ceramic material which may be metal oxide 30 thereon and by manipulation of the gun 21 form the coating 30 to the desired thickness on the various parts of form 11. While at present alumina consisting of at least 95% by weight $Al_2O_3$ is preferred because it has relatively low shrinkage characteristics coupled with high strength and is more than sufficiently refractory, I am currently using 98½% $Al_2O_3$. Other oxides could be used. In a general sense, any ceramic material can be used that can be softened or fused and heat-sprayed to form a ceramic coating of sufficient strength for subsequent processing. This includes stabilized zirconia consisting of zirconia plus hafnia plus lime to a total of at least 95%, zirconia plus hafnia plus silica to a total of at least 95%. Also chromia, titania and many other oxides can be used.

Instead of using the Wheildon process I can provide the ceramic material in the form of a powder and use a powder spraying gun, such as a Metco Thermo Spray Gun manufactured and sold by Metallizing Engineering Company, Inc., Westbury, Long Island, New York. I am not aware of any patent so cannot cite one. This gun flame-sprays ceramic powders of many different kinds, including alumina base, titania base, and zirconia base powders.

Many ceramic compositions can be shrunk and densified desirably, with linear firing shrinkage less than 10%, employing the various techniques described herein. Various silicates and porcelain compositions that produce flame-sprayed coatings, compounded of such materials as kaolins, ball clays, feldspars, flint, frits and others in various proportions can be used. Silica-free compositions can be employed, compounded of materials such as alumina, zirconia, titania, etc. Combinations of silica-free materials can be used. Other inorganic materials which can be laid down successfully by heat-spray processes can be used to make shells in accordance with this invention. It is unnecessary further to describe the nature of the material that can be used to make the shells as this would merely be defining by examples, most of the ceramic field.

The next step in the process when the coating 30 has been completed to specifications is to eliminate the form 11. As stated above this can be done in many ways and therefore I am not restricted to any particular way of eliminating the form 11. Assuming that the form 11 is made from carbon, preferably with a low ash content, one practical and simple way of eliminating it is by burning it out. Since the coating 30 is somewhat porous, it is sufficient if the form 11 having the coating 30 is heated in an oxidizing atmosphere. For thick coatings the rate of diffusion of gases through the coating will be slower than for thin coatings. The rate of oxidation is increased by circulating the air and maintaining an oxidizing atmosphere.

In Figure 4, I show a typical electric kiln 31 having resistor bars 32 made of silicon carbide connected to conductors 33 and 34 connected to terminals 35 and 36 connected to power by conductors 37 and 38. The form 11 with its coating 30 is shown mounted on a refractory table 39 in the kiln. Kilns of this type are capable of reaching and holding temperatures of about 1000° C. for a long time and this temperature is satisfactory for burning out carbon. Desirably, refractory table 39 has a hole or holes through it under the carbon form to facilitate access of air for combustion of the carbon. As a result of this step in this process the form 11 was eliminated having become carbon dioxide and the coating 30 is now a shell. In many cases it is not necessary to burn up the entire form as prior to that event it is usually free from the shell.

This step in the process, namely burning out the carbon form 11 causes both the form 11 and the coating to expand, and this is why the material of the form should have a lower coefficient of expansion than that of the coating, because if the reverse were the case, the coating would be cracked during this step. Carbon has a lower coefficient of expansion than alumina.

The next step in the process of making a radome which must be impervious, is a surprisingly successful one. For example, up to this point in the process the type of flame-sprayed alumina described in the Wheildon patent has a layer structure, has about 10 volume percent of total pores and is not impervious. Crystallographically it is composed of gamma-type alumina of density 3.62. It is not satisfactory for radomes.

I have made the surprising discovery that all these characteristics can be radically changed by high-temperature firing, such as to cone 35. The layer structure disappears, the product becomes substantially non-porous. It becomes impermeable. The alumina is crystallographically changed into alpha alumina of density 3.98. The high density without any obvious structural trace of layer structure or entrained bubbles and the great homogeneity, as compared with the flame sprayed product from which it was made, were totally unexpected.

The high-temperature firing can be carried out in various types of kilns. One such is that of U.S. Patent 2,571,897. This regenerative kiln is illustrated schematically in Fig. 5. Cone 35 is satisfactory for most pure alumina articles and corresponds to temperatures in the vicinity of 1720° to 1750° C. in large commercial kilns, and even up to 1785° C. according to the table of temperatures of standard Orton pyrometric cones when heated at a rate of 100° C. per hour. The important feature is to use a high enough temperature to produce the necessary degree of density and hardness of the particular oxide composition material being fired. This is likely to differ from one material and mixture composition to another. About cone 35 is usually satisfactory for an alumina radome. Too high a temperature will cause deleterious slumping and bloating, and too low a temperature will not achieve sufficient maturity. The proper firing time-temperature conditions for other ceramic compositions will be readily determined by those skilled in the art from what is herein stated. Large thin walled articles should have adequate support during the firing operation, and one way to achieve this is to surround each piece with pre-fired granular refractory material of similar nature to the piece. Setting the article on a "shrinkage plate" of ceramic material having the same firing shrinkage as the product being processed, helps to eliminate cracking.

The general final firing range when all requirements for different compositions and products as discussed above are considered, may be from cone 20, or even cone 12 to 16 in special cases as a lower limit, to cone 42 for extremely refractory materials.

Fig. 5 shows five shells 40 of different sizes, set in an upright position for firing in kiln 41, having a refractory car 42 with wheels 43 resting on rails 44 for the purpose of moving the ware into and out of the kiln. Doors not shown are closed when the ware is being fired. This particular kiln 41 is not a tunnel kiln but a tunnel kiln could be used. In fact any kiln capable of firing ware at the desired cone can be used.

Radomes made in accordance with this invention will withstand high temperatures and have great strength in comparison with other ceramic materials that will withstand high temperatures. Strength is important not only in the final use of the radome but to prevent breaking during handling. Radomes are thin, usually from ⅛ inch to ⅜ inch thick. Firing of the shells after the form has been eliminated increases their strength greatly.

For example, a shell was prepared by the Wheildon process and the form eliminated. At this point the shell has a crossbending strength (modulus of rupture) of 4000 pounds per square inch, a total porosity of 11 percent with most of these pores being open pores, a bulk density of 3.2 g./cc., and consists essentially of gamma type alumina. Firing this shell to cone 35 converts the shell from gamma to alpha alumina, changes it from a water permeable to water impermeable condition, increases the bulk density from 3.2 g./cc. to 3.7 g./cc. and increases the strength about tenfold.

Another embodiment of the process is illustrated in Figures 6 and 7. The base 50 is supported by a table 51 and the base 50 supports a ring 52 which is rotated by a belt 53 driven by mechanism such as shown in Figure 3. The ring 52 is rotated on balls 54 resting in grooves of the base 50 and the ring 52 so that the pull of the belt will not draw the ring off the base. These parts can be made of metal, and non-rusting metals such as brass, bronze and aluminum are desirable.

An ogive form 55 is provided made of some suitable metal which can readily be spun to produce the hollow shape shown without any seam and aluminum is quite satisfactory. Inside the base 50 with its flame projecting into the ogive 55 is a Bunsen burner 56 connected to a hose 57 extending through a hole 58 in the base 50. Air is introduced through a tube 60 extending through another hole 61 in the base 50. The holes 58 and 61 are oversized for exhaustion of gases of combustion.

While the ogive 55 is rotating, and in this as in all other cases where the forms are rotating, a speed of about six r.p.m. is satisfactory, a water solution of salt is sprayed, as with an ordinary paint spray gun, onto the heated aluminum ogive 55. The salt can be ordinary sodium chloride and it is best to use a saturated solution. The ogive 55 should be at a temperature below the boiling point of water at the place being sprayed, but it has as high a temperature as is possible without danger of reaching the temperature of boiling water. It is readily possible to adjust the burner 56 to heat the ogive 55 to a given temperature.

The water of the solution quickly evaporates leaving a coating of salt on the ogive 55. A 10 mil coating of salt is quite satisfactory and this should be applied all over the ogive 55.

The salt coated ogive 55 is now transferred to the apparatus at the right hand side of Figure 6 being shown as supported by the same table 51. The base 70 supports a ring 72 driven by a belt 73 from apparatus like that shown in Figure 3, and rotated on balls 74. The plate 72 has a tapped hole 75 holding an upwardly extending pipe 76 in which loosely fits another pipe 77 extending downwardly through the plate 72, the base 70 and through a hole in the table 51 to a fitting 78 connected to a supply of tap water. The pipes 76 and 77 extend nearly to the inside top of the salt coated ogive 55. The water sprays out through a nozzle 79 and impinges upon the top inside of the ogive 55. It starts filling the inside of the ogive and the air escapes between the tubes 76 and 77 into the interior of the base 70 and out of hole 80 therein.

The water can escape through a hole 81 in the plate 72 to the inside of the base 70 and then out through a drain pipe 83 connected by a fitting 84 to drain. The ogive 55 fills with water after a few minutes because the hole 81 is of smaller diameter than that of the pipe 77 and there is no pressure to speak of on the water on the ogive 55 until it is full.

The hydrostatic pressure of the water in the ogive 55 would lift it from the plate 72 if it were not for the securing means better shown in Figure 7. A rubber band 90 is placed in tension partly around the edge of the plate 72 and partly around the bottom of the ogive 55 which did not have to be coated with salt. Around this rubber band 90 is a split metal band 91 with projecting ends 92 shown in Figure 6, these ends being drawn together by bolts 94.

This not only holds the ogive 55 onto the plate 72 but also seals them together so that water does not run out onto the table 51 which would be unimportant except that it would eventually get onto the floor and wet the operator's feet.

Thus by means of this apparatus the rotating ogive 55 is kept cool. It is now heat-sprayed with ceramic material, for radomes preferably alumina, with either of the spray guns previously identified or with other means. Water circulation is used to keep the temperature of the ogive 55 uniform and avoid local overheating during spraying. This minimizes stresses and avoids cracking. Since the Wheildon process produces harder, stronger coatings than other processes, it is usually preferred although other coating processes can be used.

The ogive 55 having been coated with alumina over a coating of salt about 10 mils thick, is taken off the plate 72 and put into running water. It can be put into an ordinary pail in a sink and the water run in from the faucet with a gentle flow and in two or three days the salt will have dissolved and the coating of alumina is now a shell like the shell 30 which in this case has the shape of a radome. It is easy enough to tell when the salt has sufficiently dissolved since then the shell can be lifted off the ogive 55. The shell is rinsed thoroughly in water to remove the salt solution from the surface and pores. It is dried, and is then fired at about cone 35, to mature the alumina into an impervious product.

In the above example there was a linear shrinkage of about 4% as a result of the firing operation that produced an impervious product. This low-value was a most helpful discovery. This is very different from the shrinkage that occurs when impervious pure oxide products are fabricated by conventional methods such as by dry pressing or by slip casting. For them, the normal linear shrinkage is 16 to 20% or more. Such a high shrinkage during firing in the manufacture of large and difficult shapes sets up stresses and strains in the products, giving rise to cracking and distortion, which result in prohibitive rejections and an uncertain ability to make the products at all. My process overcomes these objections because the low firing shrinkage is not sufficient to cause these serious effects when the strong radome shape is put through the final firing procedure.

Still another example of the invention consists of coating an aluminum ogive with a ten mil coating of salt by flame spraying the salt with a Metco Thermo Spray Gun above mentioned. In carrying this out experimentally, the powdered salt used was sodium chloride with a particle size of 90 mesh and finer. The aluminum ogive was mounted and water cooled in the apparatus of Figure 6 described above, and flame sprayed with salt. The salt coated ogive was then coated with aluminum oxide to constitute the radome by flame spraying with the Wheildon gun above mentioned. The radome was then ready to be removed, by dissolving the salt, drying, and firing in the manner described in the previous example.

While sodium chloride was used in the above example, other salts can also be used providing they melt above 200° C. and can be dissolved by a solvent which dissolves the salt and not the metal ogive or the ceramic coating. Obviously water is the cheapest and best solvent for ordinary use.

In another example I provided a small aluminum ogive with a smooth external surface, and coated it directly with the flame sprayed alumina without employing any water cooling, thus permitting the aluminum ogive to heat up above 250° C. during the coating operation. After coating, the ogive was rapidly cooled by quenching in water which separated the alumina shell from aluminum ogive simply by contraction on cooling. This operation has been carried out with ogives up to 4 inches in diameter, but for larger ogives easier separation is obtained by the other methods described.

Another example which was used to produce an alumina radome about 3" in diameter at the base and 6" high, illustrates the introduction and elimination of a metal coating in the process. It avoids the necessity for water cooling. A steel ogive was sprayed with a salt solution as previously described, and then the salt was coated with a thin film of copper using a metallizing gun such as the gun described in U.S. patent to Erika Morf No. 1,100,602 or the U.S. patent to H. S. Ingham No. 2,227,752, then the copper was coated with alumina with the gun described in the Wheildon patent. The steel ogive was not water cooled in this case. An 0.008" thick alumina coating was then applied. Stresses introduced by non-uniform heating in the absence of water-cooling, were removed by dissolving the salt in water as the next step. This loosened the coating from the steel shell and the product was then immersed in a solution of hydrochloric and nitric acid which removed all the metal. The alumina shell was thoroughly washed and dried. For firing, it was inverted and supported on the outside with fused bubble aluminum oxide grain.

It will thus be seen that there has been provided by this invention a process of making ceramic shells and other products in which various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

I claim:

1. Process of making ceramic products of wall thickness less than $\frac{1}{10}$ of the maximum surface dimension which comprises heat-spraying a fusible ceramic material to develop a relatively hard, stable, relatively strong coating, onto a form that is rigid but capable of being eliminated to leave a unitary ceramic, then eliminating material of the form that is adjacent to the ceramic material, and thereafter firing the formed ceramic material under conditions of time and temperature as measured by a pyrometric cone in the range from cone 12 to cone 42, the firing cone being selected to mature the composition and the shape being fired to a strong hard condition of the product without deleterious slumping or swelling, to meet a desired condition of use with less than 10 linear percent of shrinkage occurring during firing.

2. Process of claim 1 in which the product is a radome.

3. Process of claim 2 in which the radome is composed of alumina containing at least 95% by weight $Al_2O_3$.

4. Process of claim 1 in which the original form on which the heat-sprayed ceramic material is applied is flame sprayed with water-soluble salt and after the fusible ceramic material has been heat-sprayed, the salt is dissolved by means of water.

5. Process of claim 3 in which the original form on which the heat-sprayed alumina is applied consists of carbon.

6. Process of claim 4 in which the alumina is flame-sprayed from rod form and the final firing of the radome to achieve maturity is carried out at about cone 35 to produce an impervious product.

7. Process of claim 5 in which the alumina is flame-sprayed from rod form and the final firing of the radome to achieve maturity is carried out at about cone 35 to produce an impervious product.

8. Process of making ceramic products of wall thickness no greater than $\frac{1}{2}''$ and less than $\frac{1}{20}$ of the maximum surface dimension, which comprises heat-spraying a fusible ceramic material to produce a relatively hard, stable, relatively strong coating on a form that is rigid but is capable of being eliminated to leave a unitary ceramic, then eliminating material of the form that is adjacent to the ceramic material, and thereafter firing the formed ceramic material under conditions of time and temperature as measured by a pyrometric cone in the range from cone 20 to cone 42, the firing cone being selected to mature the composition and the shape being fired to a strong hard condition of the product without deleterious slumping or swelling to meet a desired condition of use with less than 10 linear percent of shrinkage occurring during firing.

References Cited in the file of this patent

UNITED STATES PATENTS

| | | |
|---|---|---|
| 1,128,175 | Morf | Feb. 9, 1915 |
| 1,762,723 | Manly | June 10, 1930 |
| 1,950,604 | Fitzgerald | Mar. 13, 1934 |
| 2,195,950 | Wood | Apr. 2, 1940 |
| 2,272,342 | Hyde | Feb. 10, 1942 |
| 2,285,502 | Dreyfus | June 9, 1942 |
| 2,293,089 | Wainer | Aug. 18, 1942 |
| 2,559,763 | Ginder et al. | July 10, 1951 |
| 2,707,691 | Wheildon | May 3, 1955 |
| 2,735,155 | Glaser | Feb. 21, 1956 |
| 2,752,731 | Altosaar | July 3, 1956 |
| 2,898,660 | Maxwell | Aug. 11, 1959 |

FOREIGN PATENTS

| | | |
|---|---|---|
| 464,430 | Great Britain | Mar. 30, 1937 |
| 512,622 | Great Britain | Sept. 21, 1939 |

OTHER REFERENCES

Searle: Vol. 1, "Encyclopedia of the Ceramic Industries," page 146 (1929). (Copy in Div. 15.)